(12) United States Patent
Bers et al.

(10) Patent No.: US 7,092,506 B1
(45) Date of Patent: Aug. 15, 2006

(54) SYSTEMS AND METHODS FOR PROVIDING AUDIO INFORMATION TO SERVICE AGENTS

(75) Inventors: Joshua Bers, Cambridge, MA (US); Patrick Peterson, Cambridge, MA (US); Michael Roberts, Boston, MA (US); William Russell, Reading, MA (US); Lawrence R. Smith, Boxborough, MA (US)

(73) Assignee: Verizon Corporate Services Group Inc., New York, NY (US)

( * ) Notice: Subject to any disclaimer, the term of this patent is extended or adjusted under 35 U.S.C. 154(b) by 835 days.

(21) Appl. No.: 09/845,486

(22) Filed: Apr. 30, 2001

Related U.S. Application Data

(60) Provisional application No. 60/242,634, filed on Oct. 23, 2000.

(51) Int. Cl.
*H04M 3/00* (2006.01)
*H04M 5/00* (2006.01)

(52) U.S. Cl. .............................. 379/265.02; 379/266.01

(58) Field of Classification Search ................
379/265.01–266.01, 88.08–88.11, 88.12, 379/88.8
See application file for complete search history.

(56) References Cited

U.S. PATENT DOCUMENTS

| | | | | |
|---|---|---|---|---|
| 4,150,255 A | * | 4/1979 | Theis et al. ................... | 379/84 |
| 4,694,483 A | * | 9/1987 | Cheung ................. | 379/265.06 |
| 5,062,103 A | * | 10/1991 | Davidson et al. ........... | 370/270 |
| 5,181,236 A | * | 1/1993 | LaVallee et al. ......... | 379/88.22 |
| 5,185,782 A | * | 2/1993 | Srinivasan ............. | 379/210.01 |
| 5,239,460 A | * | 8/1993 | LaRoche ..................... | 705/11 |
| 5,311,583 A | | 5/1994 | Friedes et al. | |
| 5,528,678 A | * | 6/1996 | Kaplan ................... | 379/265.11 |
| 5,809,130 A | | 9/1998 | Ayala | |
| 5,812,638 A | * | 9/1998 | Muller ..................... | 379/88.09 |
| 5,987,118 A | | 11/1999 | Dickerman et al. | |
| 5,991,390 A | * | 11/1999 | Booton .................. | 379/265.02 |
| 6,108,410 A | | 8/2000 | Reding et al. | |
| 6,263,066 B1 | * | 7/2001 | Shtivelman et al. ... | 379/266.06 |
| 6,614,885 B1 | * | 9/2003 | Polcyn ..................... | 379/88.02 |
| 6,650,748 B1 | | 11/2003 | Edwards et al. | |

(Continued)

OTHER PUBLICATIONS

Wetterau, J., "CTI in the corporate enterprise," International Journal of Network Management; John Wiley & sons, vol. 8, pp. 235-243, 1998.

Ammicht, E., Gorin, A. & Tirso, A., "Knowledge Collection for Natural language spoken dialog systems," Proc. Eurospeech, vol. 3, p. 1375-1378, Budapest, Hungary, Sep. 1999.

*Primary Examiner*—Benny Q. Tieu
(74) *Attorney, Agent, or Firm*—Leonard C. Suchyta, Esq.; Joel W Wall, Esq.; Rader, Fishman & Grauer PLLC

(57) ABSTRACT

A system permits a customer service agent to receive and listen to an audio recording from a caller on a voice device (110), and thereby prepare to support the caller before connecting directly with him/her. The incoming call may originate on a public telephone network (120), and be received by a system (100). The system (100) may include one or more of an automatic call distributor/private branch exchange (130), a voice response unit (140), and a computer telephone integration server (160), and possibly a data device (180). The caller may be prompted to provide an audio message concerning the nature of the telephone call. Before being connected to the caller, the service agent may be provided with the audio message from the caller, possibly via the data device (180). After listening to the caller's previously recorded audio message and preparing to assist the caller, the agent and caller may then be directly connected together.

31 Claims, 13 Drawing Sheets

U.S. PATENT DOCUMENTS 6,771,760 B1 * 8/2004 Vortman et al. ....... 379/209.01

6,882,641 B1 4/2005 Gallick et al.

* cited by examiner

SYSTEMS AND METHODS FOR PROVIDING AUDIO INFORMATION TO SERVICE AGENTS

RELATED APPLICATION

This application claims priority under 35 U.S.C. § 119 based on U.S. Provisional Application No. 60/242,634, filed Oct. 23, 2000, the disclosure of which is hereby incorporated by reference.

FIELD OF THE INVENTION

The present invention relates generally to telecommunication systems and, more particularly, to a system and method for receiving an audio response from a caller and providing this audio input to a customer service agent prior to connecting the two parties.

BACKGROUND OF THE INVENTION

In-bound calls to a customer service agent are often subject to long delays while agents are helping other callers. Technology is needed that will speed up the communication process and allow incoming calls to reach their intended recipient as quickly, economically, and as accurately as possible.

Some existing technologies hold a communications channel open until a customer service agent is available to accept an incoming call. This is a costly approach due to potentially long hold times while other caller's are being serviced. Other techniques allow for an input of a tone or a series of tones from a caller. In this case, a caller may be asked to press a specific number on a telephone keypad in response to a question posed by the telecommunications service to help direct the incoming call to the appropriate agent. While this may allow a caller to provide his account number to an agent, it does not allow the agent to receive any specific information prior to talking to the caller. An example may clarify this problem.

Suppose that a company is trying to make the most cost effective use of its customer service agents in handling the calls of its customers concerning questions related to computer problems. The agent's goal is to satisfy the customer's request for information or technical support as quickly as possible. It would be useful for the customer service agent to be able to get detailed information related to the customer's specific question before connecting directly with the customer. This would allow the agent to obtain the appropriate reference information and be more prepared to deal with the customer's problem before talking to the customer.

Accordingly, there is a need for mechanisms that receive audio information from a caller, record that audio information, and transmit this information to an agent prior to connecting the caller and agent together.

SUMMARY OF THE INVENTION

Systems and methods consistent with the present invention address this and other needs by providing mechanisms for recording a caller's audio input in response to a verbal prompt concerning the nature of the call, and playing back this audio input to a service agent in preparation for assisting the caller. This audio input is automatically provided to the service agent just prior to connecting with the caller.

In accordance with the purpose of this invention as embodied and broadly described herein, a system that routes calls to service agents includes a switching device, a voice response device, and a server. The switching device is configured to receive an incoming call from a caller. The voice response device is configured to receive the incoming call from the switching device, prompt the caller to provide audio input relating to the incoming call, record the audio input, and send the incoming call to the switching device for transmitting to an available one of the service agents. The server is configured to associate the recorded audio input with the incoming call, receive identification of the available service agent from the switching device, and provide the recorded audio input to the available service agent.

In another implementation consistent with the present invention, a system that routes calls to service agents includes a switching device and a voice response device. The switching device is configured to receive an incoming call from a caller. The voice response device is configured to receive the incoming call from the switching device, prompt the caller to provide audio input relating to the incoming call, record the audio input, initiate a call to an available one of the service agents, provide the recorded audio input to the available service agent when the available service agent answers the initiated call, and conference the incoming call and the initiated call to permit the available service agent to service the incoming call.

In yet another implementation consistent with the present invention, a system that routes calls to service agents includes a voice response device and a switching device. The voice response device is configured to receive an incoming call from a caller, prompt the caller to provide audio input relating to the incoming call, record the audio input, initiate a call to an available one of the service agents, provide the recorded audio input to the available service agent when the available service agent answers the initiated call, and conference the incoming call and the initiated call to permit the available service agent to service the incoming call. The switching device is configured to receive the initiated call from the voice response device, store the initiated call in a call queue, and send the initiated call from the call queue to the available service agent.

In a further implementation consistent with the present invention, a network device that routes calls to service agents includes a forwarding engine and one or more audio detectors. The forwarding engine is configured to receive an incoming call from a caller, prompt the caller to provide audio input relating to the incoming call, send the incoming call to an available one of the service agents, provide the audio input to the available service agent when the available service agent answers the incoming call, receive an acknowledgement indicating that the available service agent has heard the audio input, and connect the caller to the service agent in response to the acknowledgement. The audio detector is configured to record the audio input from the caller.

In other implementations consistent with the present invention, methods for routing calls to service agents are provided.

BRIEF DESCRIPTION OF THE DRAWINGS

The accompanying drawings, which are incorporated in and constitute a part of this specification, illustrate several embodiments of the invention and, together with the description, explain the invention. In the drawings.

DETAILED DESCRIPTION

The following detailed description of implementations consistent with the present invention refers to the accompanying drawings. The same reference numbers in different drawings identify the same or similar elements. Also, the following detailed description does not limit the invention. Instead, the scope of the invention is defined by the appended claims.

Implementations consistent with the present invention provide mechanisms through which a customer service agent may listen to a prerecorded message from a caller before connecting directly with that caller. These mechanisms may allow the agent to prepare beforehand to answer a question, address a complaint, or help the caller with a problem prior to talking to the caller directly.

First Exemplary System Configuration

Figure 1:
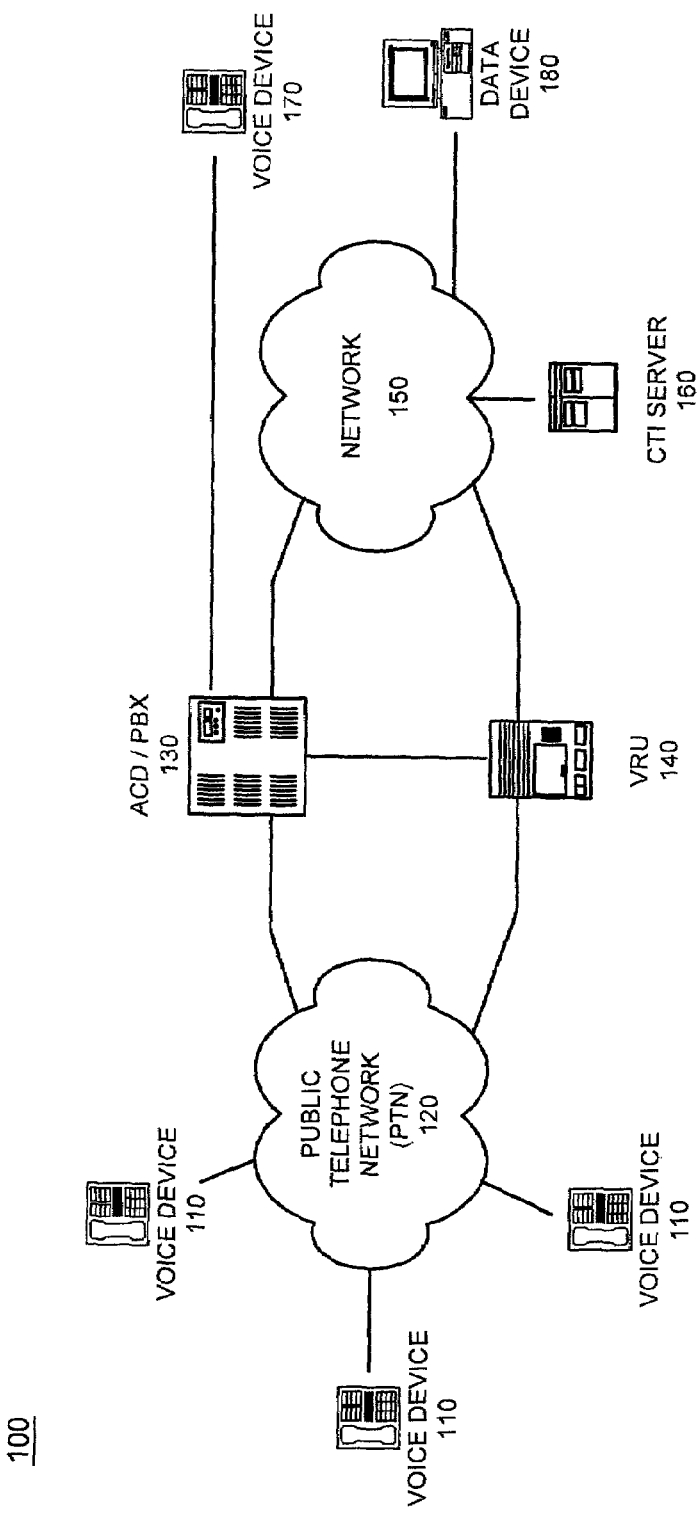
FIG. 1 illustrates an exemplary network in which systems and methods consistent with the present invention may be implemented.

FIG. 1 illustrates an exemplary system 100 in which a system and method, consistent with the present invention, may be implemented. As illustrated, the exemplary system 100 includes several voice devices 110 connected to a public telephone network (PTN) 120, an automatic call distributor/private branch exchange (ACD/PBX) 130, a voice response unit (VRU) 140, a network 150, a computer telephone integration (CTI) server 160, at least one voice device 170, and at least one data device 180. It will be appreciated that a typical system could include more or less devices than are shown in FIG. 1. In addition, it will also be appreciated that system 100 may include additional transmission devices not shown that aid in the receiving, transmitting, and/or processing of data.

The voice device 110 may consist of any device that can transmit, receive, and/or process voice data, such as a telephone. The voice device 110 may communicate through PTN 120. The PTN 120 may include one or more public or private telecommunications networks, such as the public switched telephone network (PSTN), that receives, processes, and/or transmits voice or data through various transmission media.

ACD/PBX 130 may consist of two major components: an automatic call distributor (ACD) and a private branch exchange (PBX). The ACD may consist of a mechanism that routes incoming telephone calls to the next available operator or agent. The PBX may consist of an in-house or local telephone switching system that interconnects telephone extensions to each other, as well as to the outside telephone network in a well-known manner.

The VRU 140 may consist of any type of computer system that interacts with a caller, such as a mainframe, minicomputer, or personal computer, capable of connecting to the network 150, PTN 120, and ACD/PBX 130. Network 150 may include one or more conventional networks, such as the Internet, an intranet, a wide area network (WAN), a local area network (LAN), a virtual private network, or other similar types of networks.

The CTI server 160 may include any type of computer system, such as a mainframe, minicomputer, or personal computer, capable of combining data and voice information in such a way as to enhance telephone services. The CTI server 160 may transmit and/or receive data over network 150 to/from data device 180 via a wired, wireless, optical, or any other type of connection.

The voice device 170 may consist of any device that can transmit, receive, and/or process voice data, such as a telephone. The data device 180 may consist of any type of computer system, such as a personal computer, laptop, personal digital assistant, or the like, capable of connecting to the network 150. Data device 180 may connect to network 150 in any conventional manner, such as via a wired, wireless, or optical connection.

Exemplary Automatic Call Distributor/Private Branch Exchange

Figure 2:
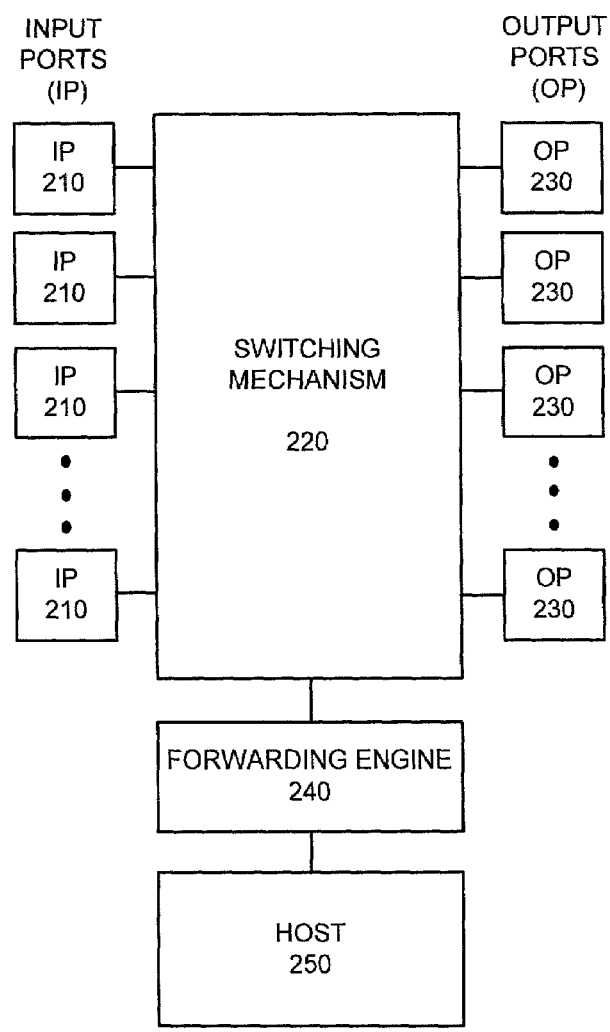
FIG. 2 illustrates an exemplary configuration consistent with the present invention of the automatic call distributor/public branch exchange (ACD/PBX) device of FIG. 1.

FIG. 2 illustrates an exemplary ACD/PBX 130 consistent with the present invention. In FIG. 2, the ACD/PBX 130 includes input ports (IP) 210, a switching mechanism 220, output ports (OP) 230, a forwarding engine 240, and a host 250.

The input ports 210 may include any conventional mechanism that provides a pathway into the switching mechanism 220, such as any mechanical or optical connection. The switching mechanism 220 may include any device, such as a mechanical or electronic device, that directs the flow of signals from the input ports 210 to the output ports 230 in a well-known manner. In an implementation consistent with the present invention, the switching mechanism 220 may consist of an in-house telephone switching system that interconnects telephone extensions to each other, as well as to the outside telephone network. The output ports 230 may include any conventional mechanism that provides a pathway out of the switching mechanism 220, such as any mechanical or optical connection.

The forwarding engine 240 may control the forwarding of calls from any input port 210 to any output port 230. For example, the forwarding engine 240 may connect a telephone call from the PTN 120 on an input port 210 to a voice device 170 or a voice response unit 140 connected to an output port 230.

The host 250 may include any type of conventional processor or microprocessor that performs call processing and management functions. For example, the host 250 may perform additional functions needed to receive and process an incoming telephone call. interprets and executes instructions.

Exemplary Voice Response Unit

Figure 3:
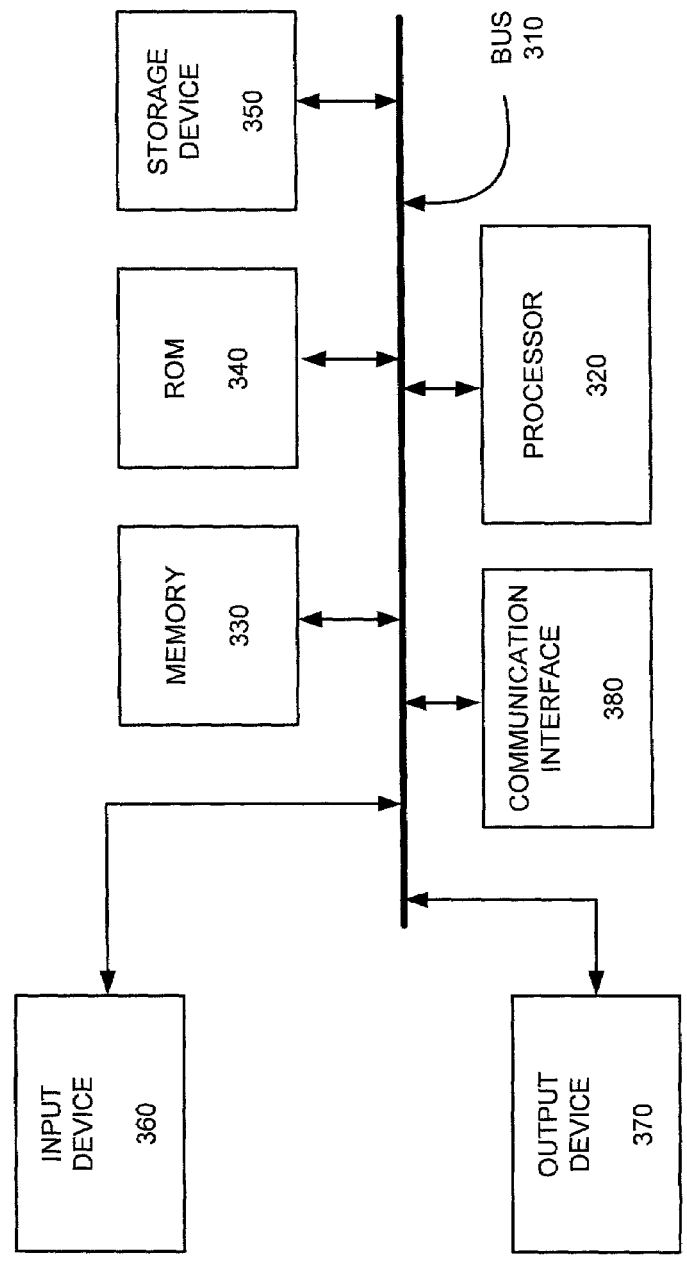
FIG. 3 illustrates an exemplary configuration consistent with the present invention of the voice response unit (VRU) of FIG. 1.

FIG. 3 illustrates an exemplary VRU 140 consistent with the present invention. In FIG. 3, the VRU 140 includes a bus 310, a processor 320, a memory 330, a read only memory (ROM) 340, a storage device 350, an input device 360, an output device 370, and a communication interface 380. The bus 310 permits communication among the components of the VRU 140.

The processor 320 may include any type of conventional processor or microprocessor that interprets and executes instructions. For example, the processor 320 may execute instructions for performing speech-recognition processes and recording audio input signals. The memory 330 may include a random access memory (RAM) or another type of dynamic storage device that stores information and instructions for execution by the processor 320. Memory 330 may also be used to store temporary variables or other intermediate information during execution of instructions by processor 320.

ROM 340 may include a conventional ROM device and/or another type of static storage device that stores static information and instructions for processor 320. The storage device 350 may include a magnetic disk or optical disk and its corresponding drive and/or some other type of magnetic or optical recording medium and its corresponding drive for storing information and/or instructions.

The input device 360, if present, may include any conventional mechanism that permits an operator to input information to the VRU 140, such as a keyboard, a mouse, a microphone, a pen, a voice recognition device, a biometric input device, etc. The output device 370, if present, may include any conventional mechanism that outputs information to the operator, including a display, a printer, a headphone, a speaker, etc.

The communication interface 380 may include any transceiver-like mechanism that enables the VRU 140 to communicate with other devices and/or systems, such as the network 150 or the PTN 120. For example, the communication interface 380 may include a modem or an Ethernet interface to a network.

The VRU 140 acts in response to processor 320 executing sequences of instructions contained in memory 330. Such instructions may be read into memory 330 from another computer-readable medium, such as a storage device 350, or from a separate device via communication interface 380. Execution of the sequences of instructions contained in memory 330 causes processor 320 to perform the process steps that will be described later. In alternative embodiments, hardwired circuitry may be used in place of or in combination with software instructions to implement the functions of the VRU 140. Thus, the VRU 140 is not limited to any specific combination of hardware circuitry and software.

A VRU 140, consistent with the present invention, may provide information to the network 150 and CTI server 160 from an associated database. The database may be stored at the VRU 140 (e.g., in memory 330) or externally from the VRU 140. The information contained within the database may change without warning, and the changes may come from any source, including the input device 360 or the communication interface 380.

Exemplary Computer Telephone Integration Server

Figure 4:
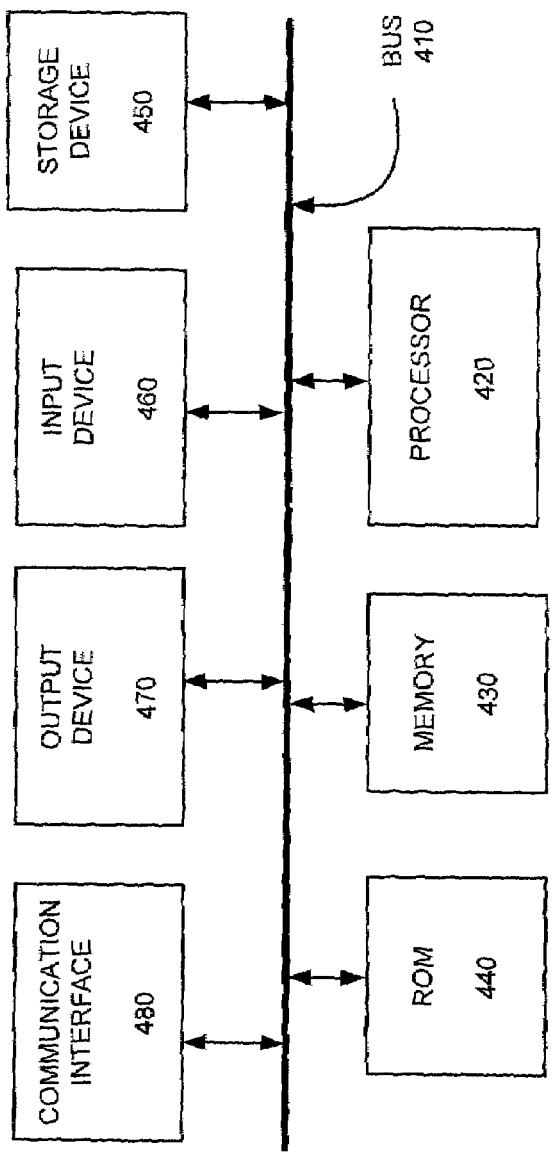
FIG. 4 illustrates an exemplary configuration consistent with the present invention of the computer telephone integration (CTI) server of FIG. 1.

FIG. 4 illustrates an exemplary CTI server 160 consistent with the present invention. In FIG. 4, the CTI server 160 includes a bus 410, a processor 420, a memory 430, a ROM 440, a storage device 450, an input device 460, an output device 470, and a communication interface 480. The bus 410 permits communication among the components of the CTI server 160.

The processor 420 may include any type of conventional processor or microprocessor that interprets and executes instructions. The memory 430 may include a RAM or another type of dynamic storage device that stores information and instructions for execution by the processor 420. Memory 430 may also be used to store temporary variables or other intermediate information during execution of instructions by processor 420.

ROM 440 may include a conventional ROM device and/or another type of static storage device that stores static information and instructions for processor 420. The storage device 450 may include a magnetic disk or optical disk and its corresponding drive and/or some other type of magnetic or optical recording medium and its corresponding drive for storing information and/or instructions.

The input device 460, if present, may include any conventional mechanism that permits an operator to input information to the CTI server 160, such as a keyboard, a mouse, a microphone, a pen, a voice recognition device, a biometric input device, etc. The output device 470, if present, may include any conventional mechanism that outputs information to the operator, including a display, a printer, a headphone, a speaker, etc.

The communication interface 480 may include any transceiver-like mechanism that enables the CTI server 160 to communicate with other devices and/or systems, such as data device 180. For example, the communication interface 480 may include a modem or an Ethernet interface to a network. Alternatively, communication interface 480 may include other mechanisms for communicating via a network, such as network 150.

The CTI server 160 acts in response to processor 420 executing sequences of instructions contained in memory 430. The instructions may be read into memory 430 from another computer-readable medium, such as a storage device 450, or from a separate device via communication interface 480. Execution of the sequences of instructions contained in memory 430 causes processor 420 to perform the process steps that will be described later. In alternative embodiments, hardwired circuitry may be used in place of or in combination with software instructions to implement the functions of the CTI server 160. Thus, the CTI server 160 is not limited to any specific combination of hardware circuitry and software.

A CTI server 160, consistent with the present invention, may provide information to the data device 180 and the network 150 from an associated database. The database may be stored at the CTI server 160 (e.g., in memory 430) or externally from CTI server 160. The information contained within the database may change without warning, and the changes may come from any source, including the input device 460 or the communication interface 480.

First Exemplary Process for Routing a Call to an Agent

Figure 5:
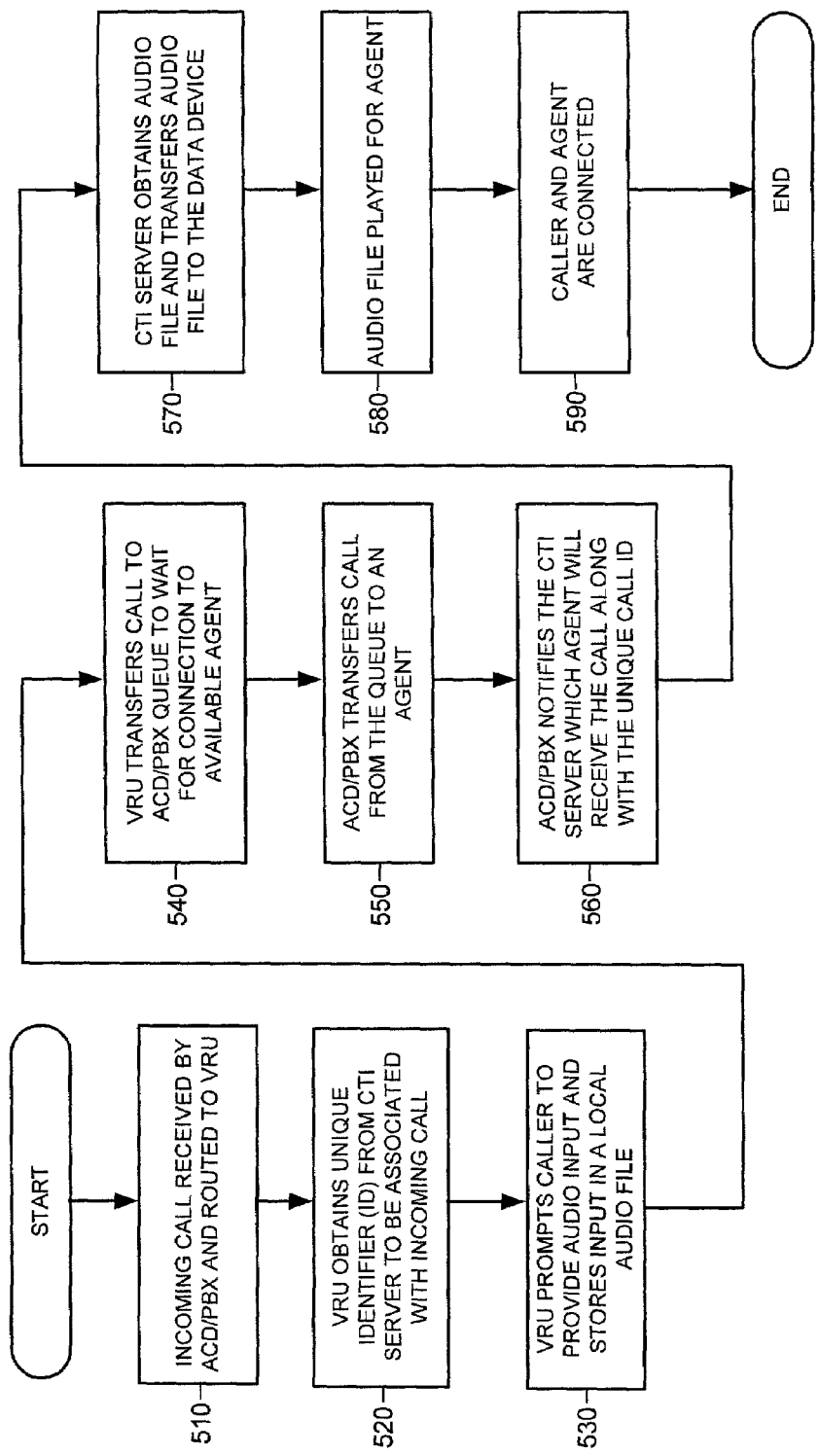
FIG. 5 illustrates exemplary processing for routing an incoming call to a customer service agent in the network of FIG. 1.

FIG. 5 illustrates exemplary processing, consistent with the present invention, for routing an incoming call to a customer service agent. Processing may begin with an incoming call being received by an ACD/PBX 130 and routed to VRU 140 [step 510]. The incoming call may, for example, be received by ACD/PBX 130 over PTN 120. ACD/PBX 130 may transfer or route the incoming call to VRU 140 through internal telephone extensions. The VRU 140 may then obtain a unique call identifier from CTI server 160 to be associated with the incoming call [step 520]. The VRU 140 may, for example, transmit a request to CTI server 160 over network 150 to obtain a unique identifier, such as a five-digit number. This unique identifier may then be uniquely associated with the incoming call by the VRU 140.

The VRU 140 may then prompt the caller for audio input and store that audio in a local audio file [step 530]. The VRU 140 may, for example, generate and transmit a voice output to the caller in the form of one or more questions, such as "How may we help you?" This function may be performed, for example, by an interactive voice response application resident in the VRU 140. The VRU 140 may then wait for a response from the caller, record the caller's voice response, and store it in the form of an audio file in a memory, such as memory 330 or storage device 350.

The VRU 140 may then transfer the incoming call back to an incoming call queue on the ACD/PBX 130 to wait for connection to the next available service agent [step 540]. The ACD/PBX 130 may service the calls stored in the queue on a first-in first-out basis, for example, by sending the calls to the next available agents. While a caller is waiting in the queue, the ACD/PBX 130 may play prerecorded music or audio advertisements until the caller is connected with a service agent.

The ACD/PBX 130 may then transfer the call from the queue to an agent [step 550]. To perform this action, ACD/PBX 130 may function as a telephone switch to connect the agent's telephone extension with the incoming call. The incoming call may then be received by the voice device 170, for example. The ACD/PBX 130 may notify the CTI server 160 of the identity of the agent who will receive the call and the unique identifier associated with the call [step 560]. The ACD/PBX 130 may communicate with CTI server 160 over the network 150 by providing the identity of the recipient agent based on the agent's telephone extension, for example. The CTI server 160 may contain a database that correlates an agent's data device 180 with his/her voice device 170 extension.

The CTI server 160 may then obtain the audio file and, possibly, other information associated with the incoming call from the VRU 140 using, for example, the unique identifier, and transfer the audio file (and other information) to the agent's data device 180 [step 570]. The data device 180 may receive the audio file from CTI server 160 over network 150 and play the audio file for the agent [step 580]. When the audio file arrives, data device 180 may, for example, play the audio file through a speaker or through an audio mixer that goes to voice device 170. After the agent has heard the audio input from the caller and made any necessary preparations to handle the incoming call, the agent may then connect with the caller [step 590]. Connection with the caller may be achieved, for example, through the agent's action of pressing a button on the voice device 170 that will enable the agent to speak directly with the caller. The agent may then service the incoming call.

Second Exemplary System Configuration

Figure 6:
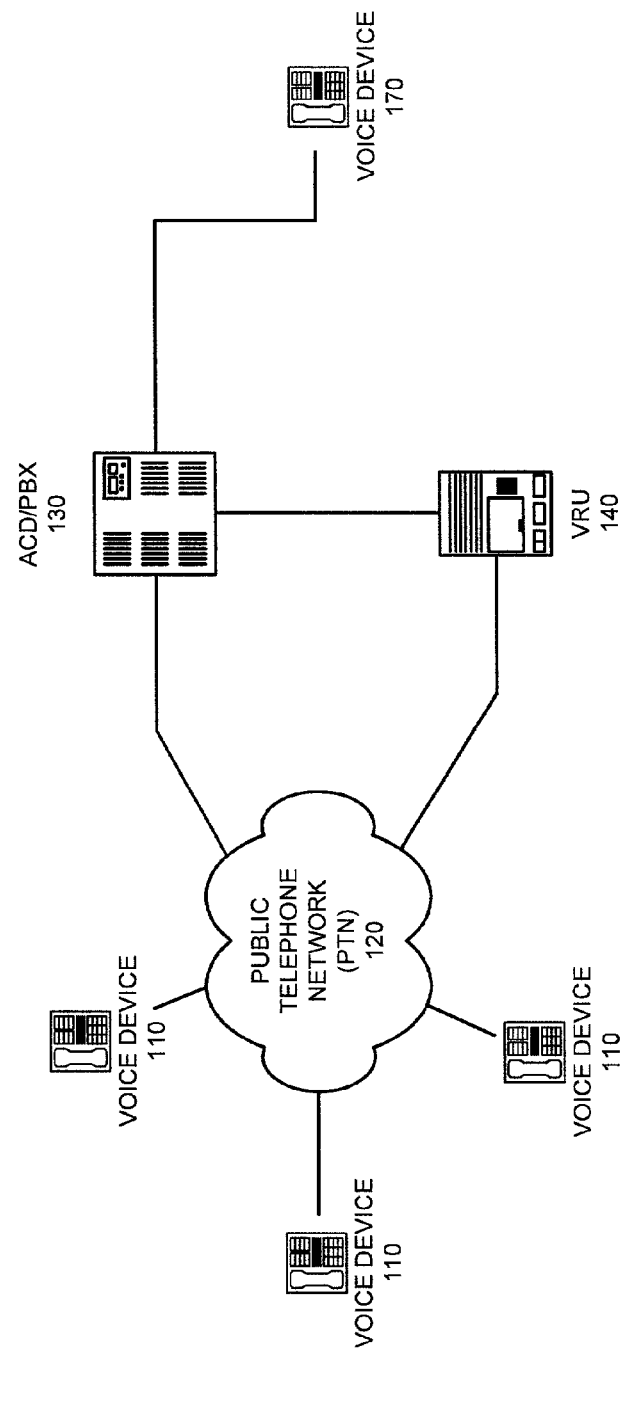
FIG. 6 illustrates an exemplary network in which systems and methods consistent with an alternate implementation of the present invention may be implemented.

FIG. 6 illustrates an exemplary system 600 in which an alternate system and method, consistent with the present invention, may be implemented. As illustrated, the exemplary system 600 includes several voice devices 110 connected to a PTN 120, an ACD/PBX 130, a VRU 140, and at least one voice device 170. It will be appreciated that a typical system could include more or less devices than are shown in FIG. 6. In addition, it will also be appreciated that system 600 may include additional transmission devices not shown that aid in the receiving, transmitting, and/or processing of data.

The voice device 110 may consist of any device that can transmit, receive, and/or process voice data, such as a telephone. The voice device 110 may communicate through PTN 120. The PTN 120 may include one or more public or private telecommunications networks, such as the PSTN, that receives, processes, and/or transmits voice or data through various transmission media.

ACD/PBX 130 may consist of two major components: an automatic call distributor (ACD) and a private branch exchange (PBX). The ACD may consist of a mechanism that routes incoming telephone calls to the next available operator or agent. The PBX may consist of an in-house or local telephone switching system that interconnects telephone extensions to each other, as well as to the outside telephone network in a well-known manner. The ACD/PBX 130 may be configured similar to that shown in FIG. 2.

The VRU 140 may consist of any type of computer system that interacts with a caller, such as a mainframe, minicomputer, or personal computer, capable of connecting to the PTN 120 and ACD/PBX 130. The VRU 140 may be configured similar to that shown in FIG. 3.

The voice device 170 may consist of any device that can transmit, receive, and/or process voice data, such as a telephone.

Second Exemplary Process for Routing a Call to an Agent

Figure 7:
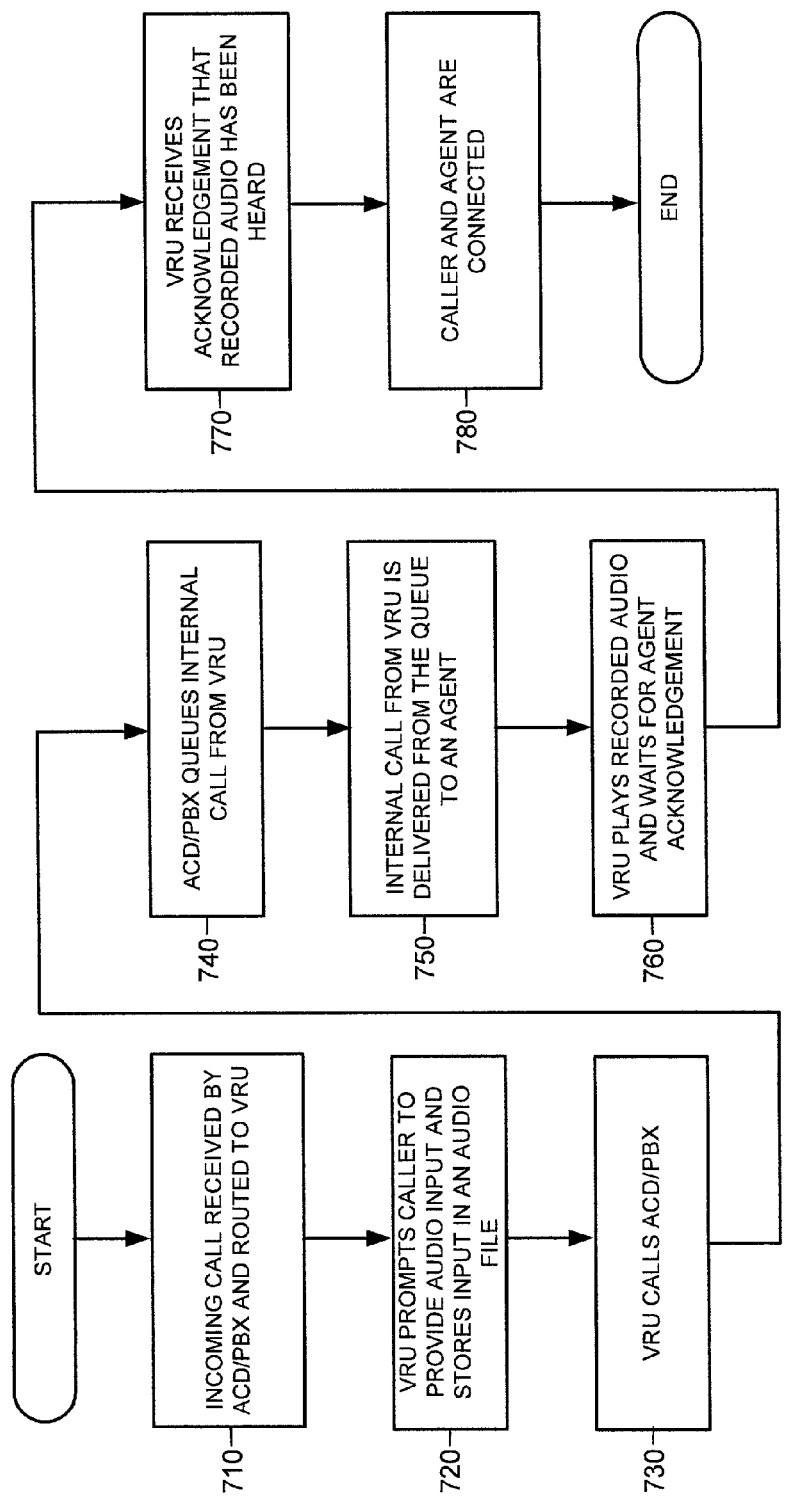
FIG. 7 illustrates exemplary processing for establishing a communications session between a caller and a customer service agent in the network of FIG. 6.

FIG. 7 illustrates exemplary processing, consistent with an alternate embodiment of the present invention, for routing an incoming call to a customer service agent. Processing may begin with an incoming call being received by the ACD/PBX 130, which it routes to the VRU 140 [step 710]. The incoming call may, for example, be received by ACD/PBX 130 from a caller over PTN 120. ACD/PBX 130 may transfer or route the incoming call to the VRU 140 through internal telephone extensions.

The VRU 140 may prompt the caller for audio input and store that audio in a local audio file [step 720]. The VRU 140 may, for example, generate and transmit a voice output to the caller in the form of one or more questions, such as "How may we help you?" This function may be performed, for example, by an interactive voice response application resident in the VRU 140. The VRU 140 may then wait for a response from the caller, record the caller's voice response, and store it in the form of an audio file in a memory, such as memory 330 or storage device 350 (FIG. 3).

The VRU 140 may then place a call to the ACD/PBX 130 [step 730]. The VRU 140 may initiate an internal call or connection to ACD/PBX 130 by issuing a transfer or conference call request to the ACD/PBX 130. The internal call may be routed over internal telephone extension lines from the VRU 140 to the ACD/PBX 130.

The ACD/PBX 130 may queue the internal call from the VRU 140 [step 740]. The ACD/PBX 130 may service the calls that are waiting in the queue on a first-in first-out basis. The internal call from the VRU 140 may then be delivered to the agent [step 750]. The ACD/PBX 130 may route the internal call from the VRU 140 to the voice device 170 at the agent's location over local telephone lines. Once the agent answers the call, the VRU 140 may play the recorded audio file for the agent and wait for an acknowledgment [step 760]. The agent may listen to the audio recording through the voice device 170. When the agent finishes and has performed any preliminary actions necessary to help the caller, the agent may indicate his/her acknowledgment of having heard the audio recording by pressing a button on the keypad of the voice device 170, by speaking a specific word or phrase into the voice device 170, or through any other appropriate action.

The VRU 140 may receive the acknowledgment that the agent has heard the recorded audio file [step 770]. The VRU 40 may interpret the tones created by the voice device 170 or the speech provided by the agent through voice device 170 as the acknowledgment by the agent. When the agent acknowledgment is received, the VRU 140 may bridge or conference the call into and the call out of the VRU 140, thereby enabling the caller and the agent to speak with one another [step 780]. In some implementations consistent with the present invention, the lines to and from the VRU 140 may be dropped while keeping the caller connected to the agent through the ACD/PBX 130. The agent may then service the call.

Third Exemplary System Configuration

Figure 8:
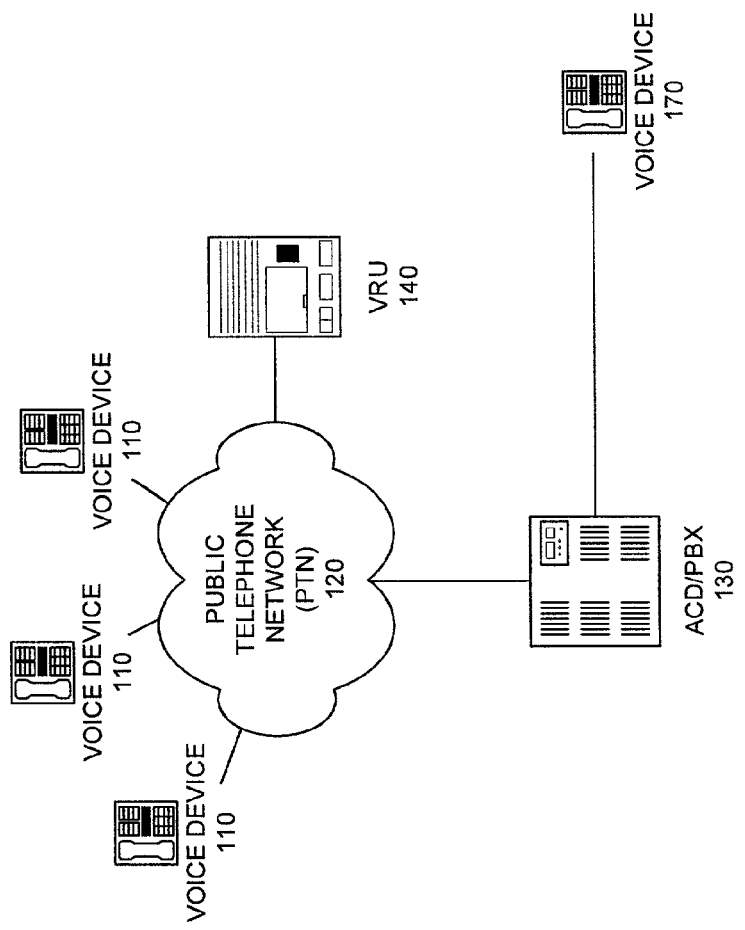
FIG. 8 illustrates an exemplary network in which systems and methods consistent with another implementation of the present invention may be implemented.

FIG. 8 illustrates an exemplary system 800 in which an alternate system and method, consistent with the present invention, may be implemented. As illustrated, the exemplary system 800 includes several voice devices 110 connected to a PTN 120, an ACD/PBX 130, a VRU 140, and at least one voice device 170. It will be appreciated that a typical system could include more or less devices than are shown in FIG. 8. In addition, it will also be appreciated that system 800 may include additional transmission devices not shown that aid in the receiving, transmitting, and/or processing of data.

The voice device 110 may consist of any device that can transmit, receive, and/or process voice data, such as a telephone. The voice device 110 may communicate through PTN 120. The PTN 120 may include one or more public or private telecommunications networks, such as the PSTN, that receives, processes, and/or transmits voice or data through various transmission media.

ACD/PBX 130 may consist of two major components: an automatic call distributor (ACD) and a private branch exchange (PBX). The ACD may consist of a mechanism that routes incoming telephone calls to the next available operator or agent. The PBX may consist of an in-house or local telephone switching system that interconnects telephone extensions to each other, as well as to the outside telephone network in a well-known manner.

The VRU 140 may consist of any type of computer system that interacts with a caller, such as a mainframe, minicomputer, or personal computer, capable of connecting to the PTN 120. The voice device 170 may consist of any device that can transmit, receive, and/or process voice data, such as a telephone.

Third Exemplary Process for Routing a Call to an Agent

Figure 9:
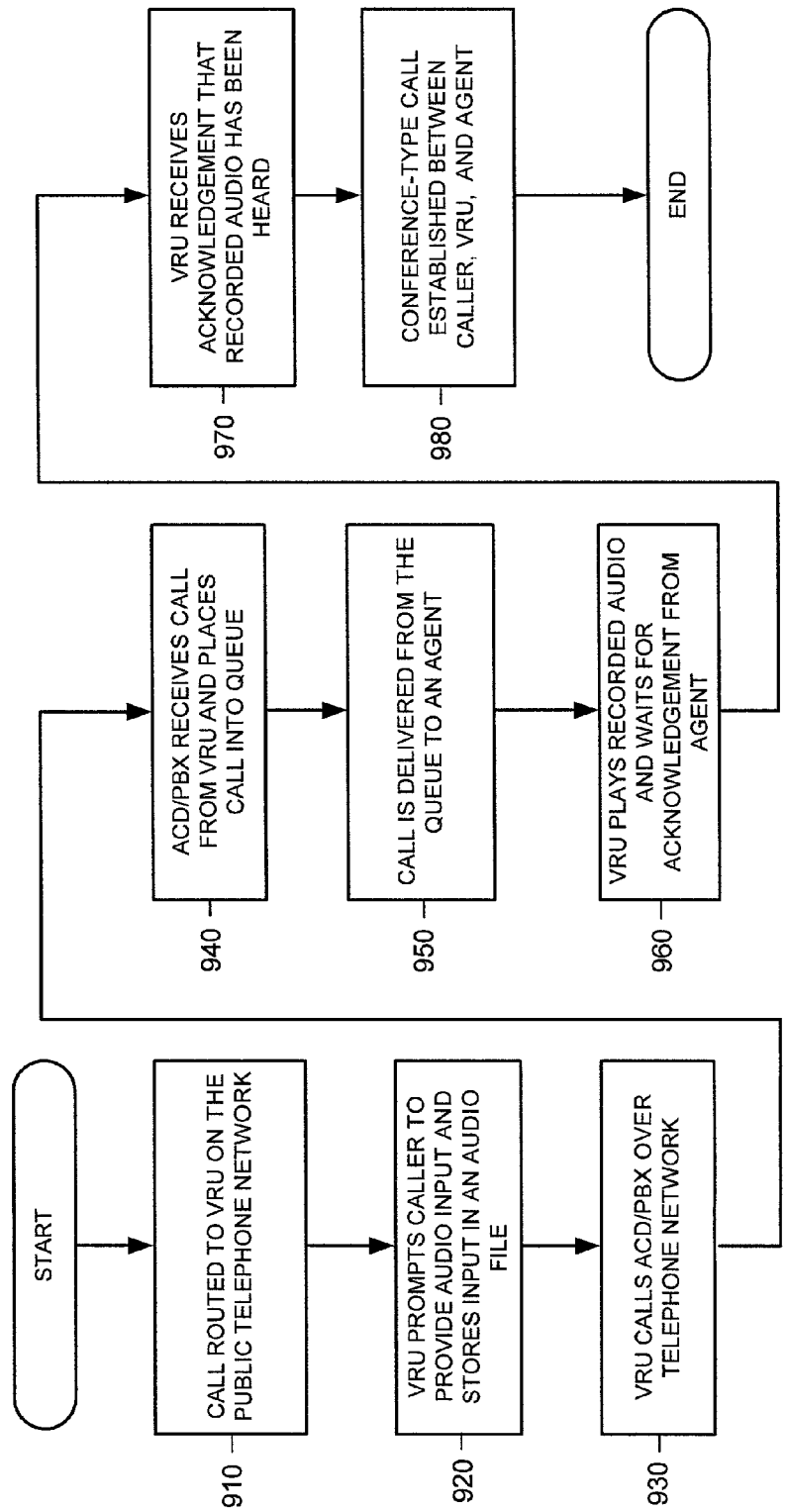
FIG. 9 illustrates exemplary processing for connecting a caller and a customer service agent in the network of FIG. 8.

FIG. 9 illustrates exemplary processing, consistent with an alternate embodiment of the present invention, for routing an incoming call to a customer service agent. Processing may begin with an incoming call being received by the VRU 140 [step 910]. The call may be received by VRU 140 over PTN 120. The VRU 140 may be located anywhere on PTN 120, and, in some cases, may not physically reside in the same location as ACD/PBX 130 or voice device 170.

The VRU 140 may prompt the caller for audio input and store that audio in a local audio file [step 920]. The VRU 140 may, for example, generate and transmit a voice output to the caller in the form of one or more questions, such as "How may we help you?" This function may be performed, for example, by an interactive voice response application resident in the VRU 140. The VRU 140 may then wait for a response from the caller, record the caller's voice response, and store it in the form of an audio file in a memory, such as memory 330 or storage device 350 (FIG. 3). The VRU 140 may then place a call to the ACD/PBX 130 over PTN 120 [step 930]. The VRU 140 may call ACD/PBX 130 over any public or private telephone network, such as the PTN 120.

The ACD/PBX 130 receives the call from the VRU 140 and places it into a call waiting queue [step 940]. The ACD/PBX 130 may service the calls waiting in the queue on a first-in first-out basis. The call from the VRU 140 may then be delivered to an agent [step 950]. The ACD/PBX 130 may route the call from the VRU 140 to the voice device 170 at the agent's location over local telephone lines. The VRU 140 may then play the recorded audio file for the agent and wait for an acknowledgment [step 960]. The agent may listen to the audio recording through the voice device 170. When the agent finishes and has performed any preliminary actions necessary to help the caller, the agent may indicate his/her acknowledgment of having heard the audio recording by pressing a button on the keypad of voice device 170, by speaking a specific word or phrase into the voice device 170, or through any other appropriate action.

The VRU 140 may receive the acknowledgment that the agent has heard the recorded audio file [step 970]. The VRU 140 may interpret the tones created by the voice device 170 or the speech provided by the agent through voice device 170 as the acknowledgment by the agent. When the agent acknowledgment is received, the call into the VRU 140 and the call out of the VRU 140 may be bridged or conferenced together thereby enabling the caller and the agent to speak to one another [step 980]. In some cases, the calls to and from the VRU 140 may be dropped while keeping the caller connected to the agent over PTN 120 and through ACD/PBX 130. The agent may then service the call.

Fourth Exemplary System Configuration

Figure 10:
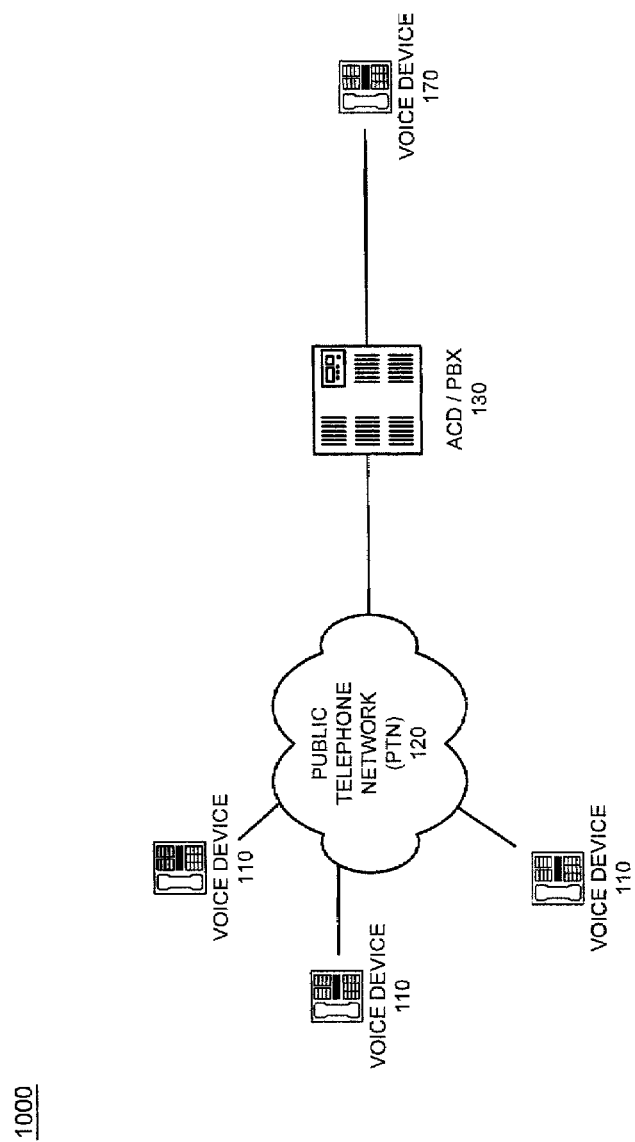
FIG. 10 illustrates an exemplary network in which systems and methods consistent with a further implementation of the present invention may be implemented.

FIG. 10 illustrates an exemplary system 1000 in which an alternate system and method, consistent with the present invention, may be implemented. As illustrated, the exemplary system 1000 includes several voice devices 110 connected to a PTN 120, an ACD/PBX 130, and at least one voice device 170. It will be appreciated that a typical system could include more or less devices than are shown in FIG.

10. In addition, it will also be appreciated that system 1000 may include additional transmission devices not shown that aid in the receiving, transmitting, and/or processing of data.

The voice device 110 may consist of any device that can transmit, receive, and/or process voice data, such as a telephone. The voice device 110 may communicate through PTN 120. The PTN 120 may include one or more public or private telecommunications networks, such as the PSTN, that receives, processes, and/or transmits voice or data through various transmission media.

ACD/PBX 130 may consist of two major components, an automatic call distributor (ACD) and a private branch exchange (PBX). The ACD may consist of mechanisms that route incoming telephone calls to the next available operator or agent, perform speech detection, and record the speech input of a caller. The ACD may receive the caller's voice input and record it in an audio file. The PBX may consist of an in-house or local telephone switching system that interconnects telephone extensions to each other, as well as to the outside telephone network in a well-known manner.

The voice device 170 may consist of any device that can transmit, receive, and/or process voice data, such as a telephone.

Fourth Exemplary Process for Routing a Call to an Agent

Figure 11:
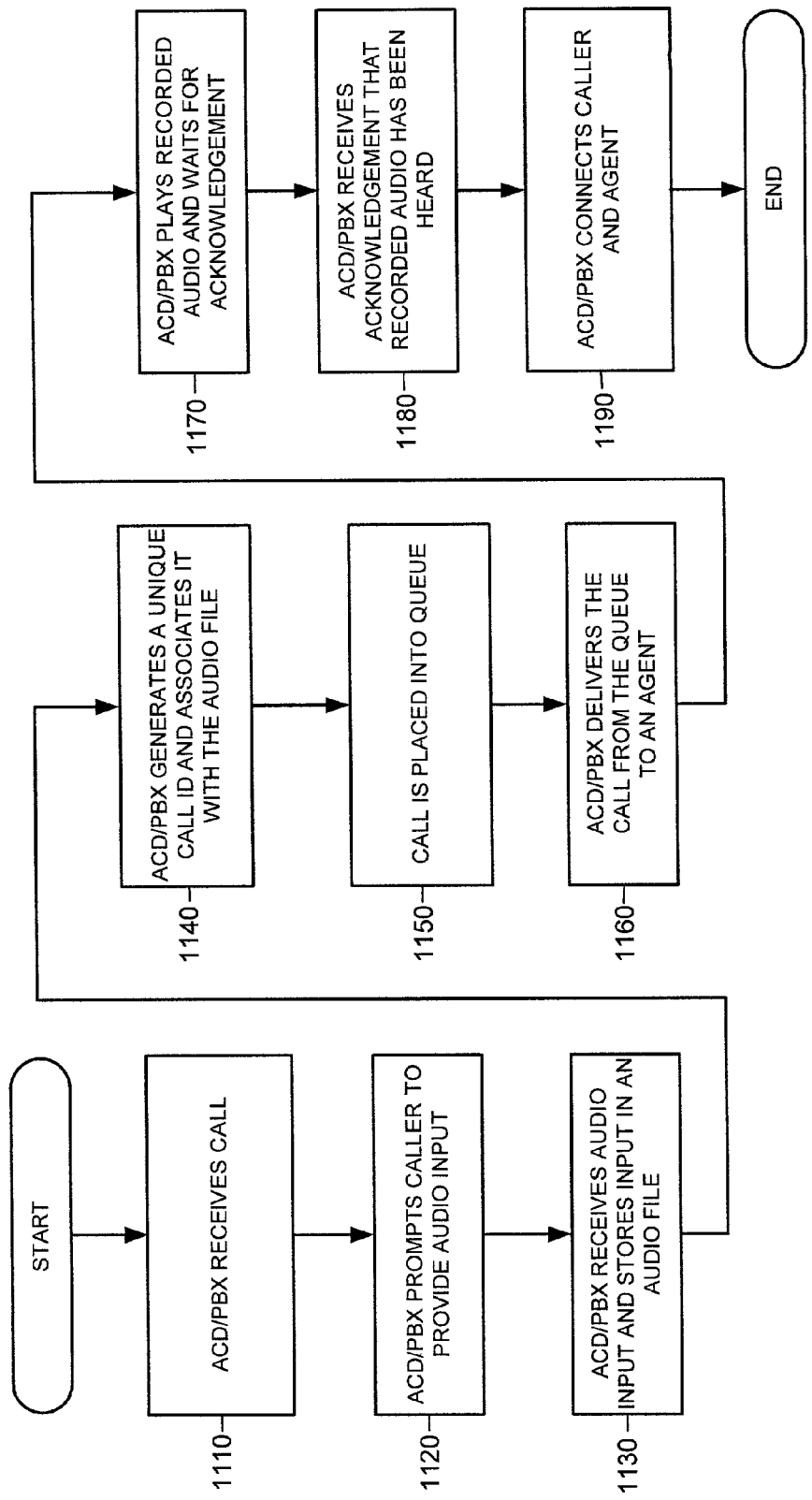
FIG. 11 illustrates exemplary processing for routing an incoming call to a customer service agent in the network of FIG. 10.

FIG. 11 illustrates exemplary processing, consistent with an alternate embodiment of the present invention, for routing an incoming call to a customer service agent. Processing may begin with an incoming call being received by the ACD/PBX 130 [step 1110]. The call may be received by ACD/PBX 130 over PTN 120.

The ACD/PBX 130 may prompt the caller for audio input [step 1120]. The ACD/PBX 130 may, for example, generate and transmit a voice output to the caller in the form of one or more questions, such as "How may we help you?" This function may be performed, for example, by an interactive voice response application resident in the ACD/PBX 130. The ACD/PBX 130 may then connect a speech detector/recorder to the call and wait for a response from the caller. The ACD/PBX 130 may then receive the audio input from the caller and store it in memory [step 1130]. For example, the ACD/PBX 130 may record the caller's voice response and store it in the form of an audio file in an internal or external memory.

The ACD/PBX 130 may generate a unique call identifier and associate it with the audio file [step 1140]. The unique call identifier may take the form of a specific number of digits that the ACD/PBX 130 may use to index and retrieve the audio file from memory. The ACD/PBX 130 may then place the call into its queue [step 1150]. The ACD/PBX 130 may play prerecorded music or other audio information to the caller while his/her call is waiting in the queue. The ACD/PBX 130 may service incoming calls on a first-in first-out basis.

The ACD/PBX 130 may then deliver the call to an agent [step 1160]. The call may be delivered to the voice device 170 at the agent's location over local telephone lines. The ACD/PBX 130 may play the recorded audio from the audio file and wait for an acknowledgment [step 1170]. The agent may listen to the audio recording through the voice device 170. When the agent finishes and is ready to assist the caller, the agent may indicate his/her acknowledgment of having heard the audio recording by pressing a button on the keypad of the voice device 170, by speaking a specific word or phrase into the voice device 170, or through any other appropriate action.

The ACD/PBX 130 may receive the acknowledgment that the audio file has been heard [step 1180]. The ACD/PBX 130 may interpret the tones created by the voice device 170 or the speech provided by the agent through the voice device 170 as the acknowledgment by the agent. The ACD/PBX 130 may connect the caller and the agent through local telephone lines [step 1190]. The agent may then service the call.

Fifth Exemplary System Configuration

Figure 12:
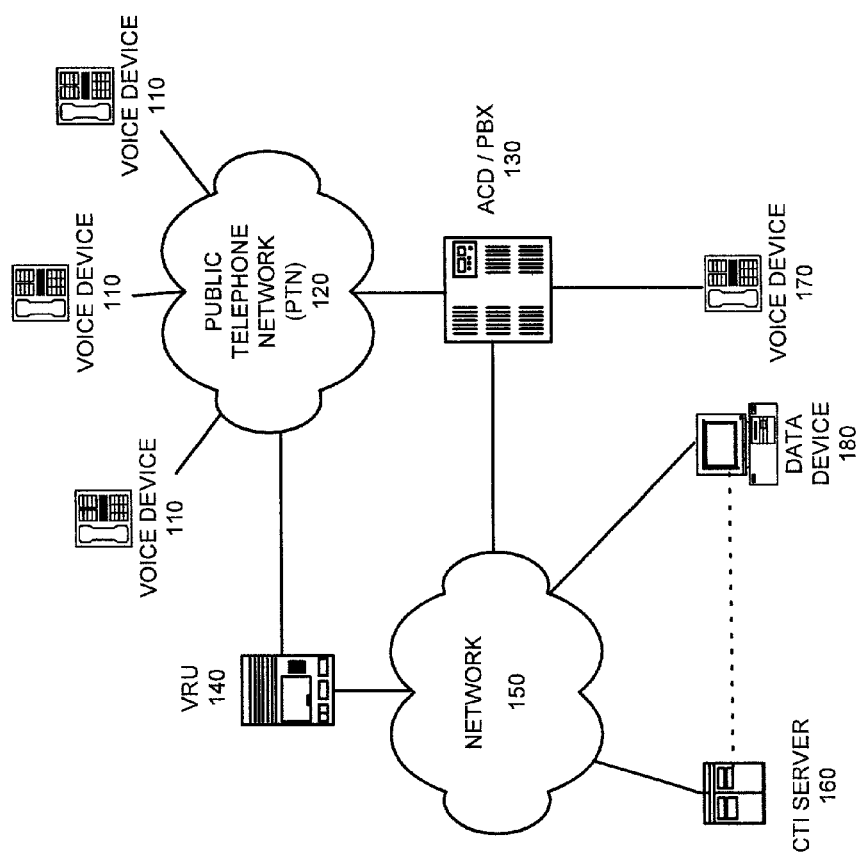
FIG. 12 illustrates an exemplary network in which systems and methods consistent with an alternate implementation of the present invention may be implemented.

FIG. 12 illustrates an exemplary system 1200 in which an alternate system and method, consistent with the present invention, may be implemented. As illustrated, the exemplary system 1200 includes several voice devices 110 connected to a PTN 120, an ACD/PBX 130, a VRU 140, a network 150, a CTI server 160, at least one voice device 170, and at least one data device 180. It will be appreciated that a typical system could include more or less devices than are shown in FIG. 12. In addition, it will also be appreciated that system 1200 may include additional transmission devices not shown that aid in the receiving, transmitting, and/or processing of data.

The voice device 110 may consist of any device that can transmit, receive, and/or process voice data, such as a telephone. The voice device 110 may communicate through PTN 120. The PTN 120 may include one or more public or private telecommunications networks, such as the PSTN, that receives, processes, and/or transmits voice or data through various transmission media.

ACD/PBX 130 may consist of two major components: an ACD and a PBX. The ACD may consist of a mechanism that routes incoming telephone calls to the next available operator or agent. The PBX may consist of an in-house or local telephone switching system that interconnects telephone extensions to each other, as well as to the outside telephone network in a well-known manner.

The VRU 140 may consist of any type of computer system that interacts with a caller, such as a mainframe, minicomputer, or personal computer, capable of connecting to the network 150 and the PTN 120. Network 150 may include one or more conventional networks, such as the Internet, an intranet, a WAN, a LAN, a virtual private network, or other similar types of networks.

The CTI server 160 may include any type of computer system, such as a mainframe, minicomputer, or personal computer, capable of combining data and voice information in such a way as to enhance telephone services. The CTI server 160 may transmit and/or receive data over network 150 to/from the VRU 140, the ACD/PBX 130, and/or the data device 180 via a wired, wireless, optical, or any other type of connection. In another implementation consistent with the present invention, the CTI server 160 connects to the data device 180 via a direct connection, such as an Ethernet connection.

The voice device 170 may consist of any device that can transmit, receive, and/or process voice data, such as a telephone. The data device 180 may consist of any type of computer system, such as a personal computer, laptop, personal digital assistant, or the like, capable of connecting to the network 150. Data device 180 may connect to network 150 in any conventional manner, such as via a wired, wireless, or optical connection.

Fifth Exemplary Process for Routing a Call to an Agent

Figure 13:
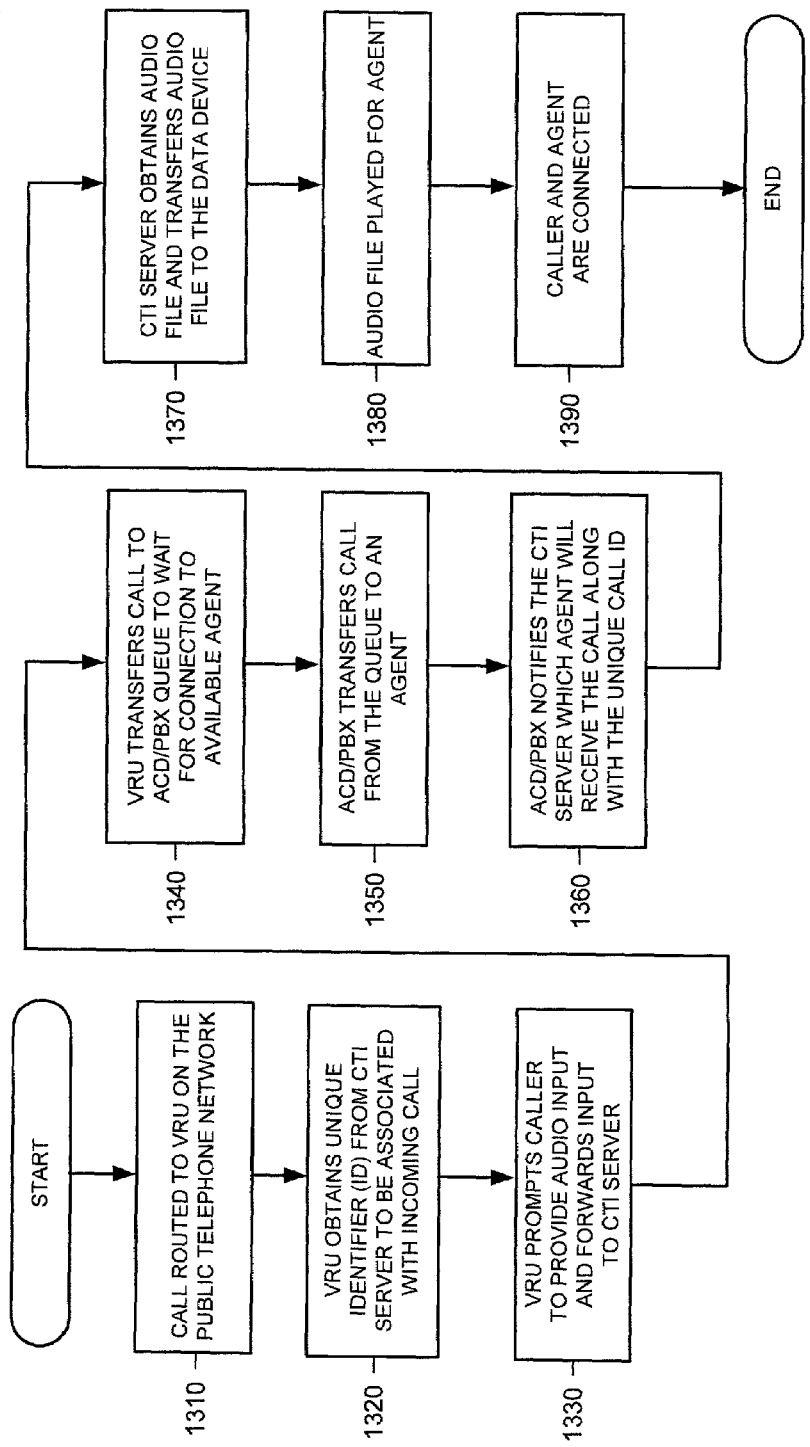
FIG. 13 illustrates exemplary processing for routing an incoming call to a customer service agent in the network of FIG. 12.

FIG. 13 illustrates exemplary processing, consistent with an alternate embodiment of the present invention, for routing an incoming call to a customer service agent. Processing may begin with an incoming call being received by the VRU 140 [step 1310]. The call may be received by VRU 140 over PTN 120. The VRU 140 may be located anywhere on PTN 120 and, in some cases, may not physically reside in the same location as ACD/PBX 130 or voice device 170.

The VRU 140 may obtain a unique call identifier from CTI server 160 to be associated with the incoming call [step 1320]. The VRU 140 may, for example, transmit a request to CTI server 160 over network 150 to obtain a unique identifier, such as a five-digit number. This unique identifier may then be uniquely associated with the incoming call by the VRU 140.

The VRU 140 may then prompt the caller for audio input and forward the audio, along with the unique identifier, to the CTI server 160 [step 1330]. The VRU 140 may, for example, generate and transmit a voice output to the caller in the form of one or more questions, such as "How may we help you?" This function may be performed, for example, by an interactive voice response application resident in the VRU 140. The VRU 140 may then wait for a response from the caller, record the caller's voice response, and send the recorded response to the CTI server 160. The CTI server 160 may store the recorded response in a file in memory.

The VRU 140 may then transfer the incoming call back to an incoming call queue on the ACD/PBX 130 to wait for connection to the next available service agent [step 1340]. The ACD/PBX 130 may service the calls stored in the queue on a first-in first-out basis, for example, by sending the calls to the next available agents. While a caller is waiting in the queue, the ACD/PBX 130 may play prerecorded music or audio advertisements until the caller is connected with a service agent.

The ACD/PBX 130 may then transfer the call from the queue to an agent [step 1350]. To perform this action, ACD/PBX 130 may function as a telephone switch to connect the agent's telephone extension with the incoming call. The incoming call may then be received by the voice device 170, for example. The ACD/PBX 130 may notify the CTI server 160 of the identity of the agent who will receive the call and the unique identifier associated with the call [step 1360]. The ACD/PBX 130 may communicate with CTI server 160 over the network 150 by providing the identity of the recipient agent based on the agent's telephone extension, for example. The CTI server 160 may contain a database that correlates an agent's data device 180 with his/her voice device 170 extension.

The CTI server 160 may then obtain the audio file and, possibly, other information associated with the incoming call using, for example, the unique identifier, and transfer the audio file (and other information) to the agent's data device 180 [step 1370]. The data device 180 may receive the audio file from CTI server 160 and play the audio file for the agent [step 1380]. When the audio file arrives, data device 180 may, for example, play the audio file through a speaker or through an audio mixer that goes to voice device 170. After the agent has heard the audio input from the caller and made any necessary preparations to handle the incoming call, the agent may then connect with the caller [step 1390]. Connection with the caller may be achieved, for example, through the agent's action of pressing a button on the voice device 170 that will enable the agent to speak directly with the caller. The agent may then service the incoming call.

CONCLUSION

Systems and methods, consistent with the present invention, provide mechanisms by which a caller may be connected with a customer service agent. Prior to connecting with the caller, the agent may listen to an audio message recorded in the caller's voice that will indicate the reason for the call and the temperament of the caller. The agent may use this information to prepare to support the caller.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while the above-described processing is directed to a caller using a voice device connected to a public telephone network, it will be appreciated that the present invention is equally applicable to a caller using a data device connected to a network, such as the Internet, an intranet, a wide area network (WAN), a local area network (LAN), or the like. In such an implementation, the caller may contact the customer service agent through an Internet telephony gateway that connects with a public telephone network.

Also, while series of steps have been described with regard to FIGS. 5, 7, 9, 11, and 13, the order of the steps may be varied in other implementations consistent with the present invention. No element, step, or instruction used in the description of the present application should be construed as critical or essential to the invention unless explicitly described as such.

The scope of the invention is defined by the claims and their equivalents.

What is claimed is:

1. A method of outing calls to service agents by one or more network devices, comprising:
  receiving an incoming call from a caller at a switching device;
  routing the incoming call to a voice response device;
  prompting the caller to provide audio input relating to the incoming call;
  assigning a unique call identifier to the incoming call;
  storing the audio input in a file associated with the unique call identifier;
  transferring the incoming call from the voice response device back to the switching device;
  storing the incoming call in a call queue within the switching device;
  providing the audio input to an available service agent; and
  connecting the caller to the available service agent alter providing the audio input to the available service agent.

2. The method of claim 1, wherein the prompting the caller includes:
  requesting, by the voice response device, the caller to provide information relating to a reason for the incoming call.

3. The method of claim 1,
  wherein a server communicates with the voice response device and the available service agent; and
  wherein the providing the audio input includes:
    receiving, by the server, an identity of the available service agent to receive the incoming call, retrieving the audio input from the file using the unique call identifier, and sending the retrieved audio input to the available service agent.

4. The method of claim 1, wherein the providing the audio input includes: obtaining additional information related to the incoming call, and providing the additional information along with the audio input to the available service agent.

5. The method of claim 1, wherein the providing the audio input includes:

sending the audio input to a data device associated with the available service agent.

6. A system for routing calls to service agents, comprising:

means for receiving calls from callers;

means for prompting the callers to provide audio input relating to the calls;

assigning a unique call identifier to the received call;

means for recording the audio input associated with the unique call identifier;

means for sending the calls to available ones of the service agents;

means for providing the audio input to the available service agents; and means for connecting the callers to the available service agents after providing the audio input to the available service agents.

7. A system for routing calls to service agents, comprising:

a switching device configured to receive an incoming call from a caller and to route the incoming call to a voice response device;

the voice response device configured to receive the incoming call from the switching device, prompt the caller to provide audio input relating to the incoming call, record the audio input, and send the incoming call to the switching device for transmitting to an available one of the service agents; and a server configured to associate the recorded audio input with the incoming call, receive identification of the available service agent from the switching device, and provide the recorded audio input to the available service agent.

8. The system of claim 7, wherein the voice response device is configured to request the caller to provide information relating to a reason for the incoming call.

9. The system of claim 7, wherein the switching device is further configured to store the incoming call in a call queue and route the incoming call from the call queue to the available service agent.

10. The system of claim 7, wherein the server is configured to generate a unique call identifier for the incoming call; and wherein the voice response device is configured to obtain the unique call identifier from the server and associate the unique call identifier with the recorded audio input.

11. The system of claim 10, wherein the server is further configured to retrieve the recorded audio input from the voice response device using the unique call identifier.

12. The system of claim 7, wherein the server is further configured to obtain additional information related to the incoming call and provide the additional information along with the recorded audio input to the available service agent.

13. The system of claim 7, wherein the server is configured to interact with a data device associated with the available service agent to play the recorded audio input for the available service agent.

14. A system for routing calls to service agents, comprising:

a switching device configured to receive an incoming call from a caller and to route the incoming call to a voice response device; and the voice response device configured to receive the incoming call from the switching device, prompt the caller to provide audio input relating to the incoming call, record the audio input, send the incoming call back to the switching device, initiate a call to an available one of the service agents, provide the recorded audio input to the available service agent when the available service agent answers the initiated call, and conference the incoming call and the initiated call to permit the available service agent to service the incoming call.

15. The system of claim 14, wherein the voice response device is further configured to send the initiated call to the switching device for transmission to the available service agent.

16. The system of claim 15, wherein the switching device is further configured to store the initiated call in a call queue and send the initiated call from the call queue to the available service agent.

17. The system of claim 14, wherein the voice response device is further configured to wait for an acknowledgement that indicates that the available service agent has heard the recorded audio input and bridge the incoming call and the initiated call in response to the acknowledgement.

18. The system of claim 14, wherein the switching device is further configured to drop a connection to the voice response device after the voice response device conferences the incoming call and the initiated call.

19. A system for routing calls to service agents, comprising:

a switching device configured to receive an incoming call from a caller; and a voice response device configured to receive an incoming call from a caller, prompt the caller to provide audio input relating to the incoming call, record the audio input, initiate a call to an available one of the service agents, provide the recorded audio input to the available service agent when the available service agent answers the initiated call, and conference the incoming call and the initiated call to permit the available service agent to service the incoming call;

wherein the switching device is further configured to receive the initiated call from the voice response device, store the initiated call in a call queue, and send the initiated call from the call queue to the available service agent.

20. The system of claim 19, wherein the voice response device is further configured to wait for an acknowledgment that indicates that the available service agent has heard the recorded audio input and bridge the incoming call and the initiated call in response to the acknowledgement.

21. The system of claim 19, wherein the switching device is further configured to drop a connection to the voice response device after the voice response device conferences the incoming call and the initiated call.

22. The system of claim 19, wherein the voice response device is configured to receive the incoming call over a public telephone network.

23. The system of claim 22, wherein the voice response device is configured to send the initiated call to the switching device over the public telephone network.

24. A network device for routing calls to service agents, comprising:
- a forwarding engine configured to receive an incoming call from a caller, prompt the caller to provide audio input relating to the incoming call, assigning a unique call identifier to the received call send the incoming call to an available one of the service agents, provide the audio input to the available service agent when the available service agent answers the incoming call, receive an acknowledgement indicating that the available service agent has heard the audio input, and connect the caller to the service agent in response to the acknowledgement; and
- one or more audio detectors configured to record the audio input from the caller.

25. The system of claim 24, wherein the forwarding engine is further configured to store the incoming call in a call queue and send the incoming call from the call queue to the available service agent.

26. A method for routing calls to service agents by one or more network devices, comprising:
- receiving an incoming call from a caller;
- prompting the caller to provide audio input relating to the incoming call;
- assigning a unique call identifier to the received call;
- recording the audio input associated with the unique call identifier;
- initialing a call to an available one of the service agents;
- providing the audio input to the available service agent when the service agent answers the initiated call; and
- connecting the caller to the available service agent to permit the available service agent to service the incoming call.

27. The method of claim 26, wherein the initiating a call includes:
- placing a conference call to the available service agent.

28. The method of claim 27, wherein the connecting the caller to the available service agent includes:
- bridging the initiated call and the incoming call together.

29. The method of claim 26, wherein the connecting the caller to the available service agent includes:
- waiting for an acknowledgement that indicates that the available service agent has heard the audio input; and
- bridging the initiated call and the incoming call in response to the acknowledgement.

30. A method for routing calls to service agents by a network device, comprising:
- receiving an incoming call from a caller;
- prompting the caller to provide audio input relating to the incoming call;
- assigning a unique call identifier to the received call;
- recording the audio input associated with the unique call identifier;
- sending the incoming call to an available one of the service agents;
- providing the audio input to the available service agent when the service agent answers the incoming call; and
- connecting the caller to the available service agent to permit the available service agent to service the incoming call.

31. The method of claim 30, wherein the connecting the caller to the available service agent includes:
- waiting for an acknowledgement that indicates that the available service agent has heard the audio input; and
- connecting the caller to the available service agent in response to the acknowledgement.

* * * * *